United States Patent
Carson et al.

[11] Patent Number: 6,105,642
[45] Date of Patent: Aug. 22, 2000

[54] PROTECTIVE LINER FOR BICYCLE TIRES

[76] Inventors: Wayne E. Carson, 2439 Norton St., Napa, Calif. 94558; William C. Shaw, 373 Tunnel La., Corte Madera, Calif. 94925

[21] Appl. No.: 09/050,188

[22] Filed: Mar. 30, 1998

[51] Int. Cl.[7] ..................................................... B60C 5/00
[52] U.S. Cl. ........................................... 152/203; 152/204
[58] Field of Search ................................ 152/203, 204, 152/511, 512, 313, 322; 156/110.1, 110, 113; 264/46.1, 177.1, 177.17, 210.2, 285

[56] References Cited

U.S. PATENT DOCUMENTS

| | | | |
|---|---|---|---|
| 788,309 | 4/1905 | Ferguson | 152/203 |
| 1,169,964 | 2/1916 | Kelley et al. | 152/204 |
| 1,279,694 | 9/1918 | Hofmeister | 152/204 |
| 1,389,093 | 8/1921 | Branen, Sr. | 152/204 |
| 1,474,387 | 11/1923 | Schoneberger | 152/204 |
| 1,585,875 | 5/1926 | Price | 152/204 |
| 1,643,999 | 10/1927 | Semple | 264/210.2 |
| 2,501,584 | 3/1950 | Schanz | 264/210.2 |
| 3,982,577 | 9/1976 | Scimeca | 152/204 |
| 4,324,279 | 4/1982 | McFarlane | 152/322 |
| 5,785,779 | 7/1998 | McGee et al. | 152/204 |

*Primary Examiner*—Geoffrey L. Knable

[57] ABSTRACT

Protective liner for bicycle or motorcycle tires with a flexible, extruded U shaped length of PVC foam that conforms to the inner diameter of a conventional bicycle tire, a method of curving the U shaped extruded foam liner so that it takes on the diameter of a bicycle tire, and a method of inserting the U shaped extruded liner into a bicycle tire. A preferred embodiment includes the liner is made of PVC foam nitrile polymer type 3pns322 from Kirkhill Rubber.

1 Claim, 1 Drawing Sheet

PROTECTIVE LINER FOR BICYCLE TIRES

BACKGROUND OF THE INVENTION

This invention relates generally to the field of pneumatic tires, and more particularly to a protective liner for bicycle tires.

Bicycle tires have been in existence since he invention of the bicycle over 100 years ago. The first tires were made of solid material, first steel and then solid rubber. Eventually a pneumatic tire was developed in which an inner tube was filled with pressurized air which supported an outer, harder, composite rubber casing. Since that time bike riders have been plagued with the problem of flat tires which occur when a sharp object pierces the outer casing and punctures the inner tube. Flat tires also can occur when a rock or pebble gets caught between the metal rim of the bicycle and the tire casing thereby causing abrasion of the tire casing which causes stress and eventual puncture of the inner tube.

There have been attempts to overcome the problem of flat tires in bicycles and other vehicles using inflated tires by using protective liners of various types which form a barrier between the inner tube and the tire casing. O'coin, in his 1980 U.S. Pat. No. 4,197,893 talks about inserting liners into the tires of construction equipment. James, in his 1980 U.S. Pat. No. 4,231,407 discusses the idea of a liner for bicycle tires.

The problem with applying the O'Coin patent to bicycles is that the proposed design calls for multiple segments of liners of foamed latex rubber. This material is quite heavy and therefore undesirable for a bicycle application where every extra ounce is critical to performance. Also the multiple segments design would be difficult to install in a bicycle tire because as one segment is installed, the previous one may fall out.

The O'Coin patent does talk of an alternate embodiment wherein the rubber or urethane is cast in place into the liner of the tire, however this technique is impractical for use as a mass consumer product for average bike riders. James's patent discloses a protective liner. The James liner has a relatively thin cross section which would not prevent a half inch nail for example from puncturing the inner tube. The James design suggests using a pair of integrally molded ribs to help keep the liner strip in place with relation to the inner wall of the tire casing. This technique seems questionable in that the liners is constructed of a relatively soft material which would not dig into the tire casing and therefore not stay in place. Theoretically, a special tire could be designed which have receiving valleys for the ribs that James proposes, however this would mean that tire manufacturers would all have to change their tire design which seems highly unlikely. James discloses that the liner is made of polyvinyl chloride plastic (pvc) however there are hundreds of variations within the pvc family many of which compress to the point where they no longer offer the desired protective qualities. James does not disclose which type of pvc is ideal for the application. Finally, the relatively flat strip that James proposes would be difficult to install in that it is difficult to keep the strip in the proper orientation while inserting the strip between the inner tube and the tire case wall. Finally, because the James liner is relatively flat, it does not protect against side wall abrasion which can occur when a rock or other debris gets trapped between the side wall and the metal rim of the wheel.

SUMMARY OF THE INVENTION

The primary object of the invention is To provide a tire liner that provides protection from unwanted flat tires .

Another object of the invention is to provide an inexpensive way to protect inner tubes from being exposed to sharp objects.

Another object of the invention is to provide a means to reduce sidewall tears.

Yet another object of the invention is to provide a tire liner that does not easily compress over time.

Other objects and advantages of the present invention will become apparent from the following descriptions, taken in connection with the accompanying drawings, wherein, by way of illustration and example, an embodiment of the present invention is disclosed.

Protective liner for bicycle tires or motorcycle tires comprising: a flexible, extruded U shaped length of PVC foam that conforms to the inner walls of a conventional bicycle tire, a method of curving the U shaped extruded foam liner so that it takes on the diameter of a bicycle tire, and a method of inserting the U shaped extruded liner into a bicycle tire.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
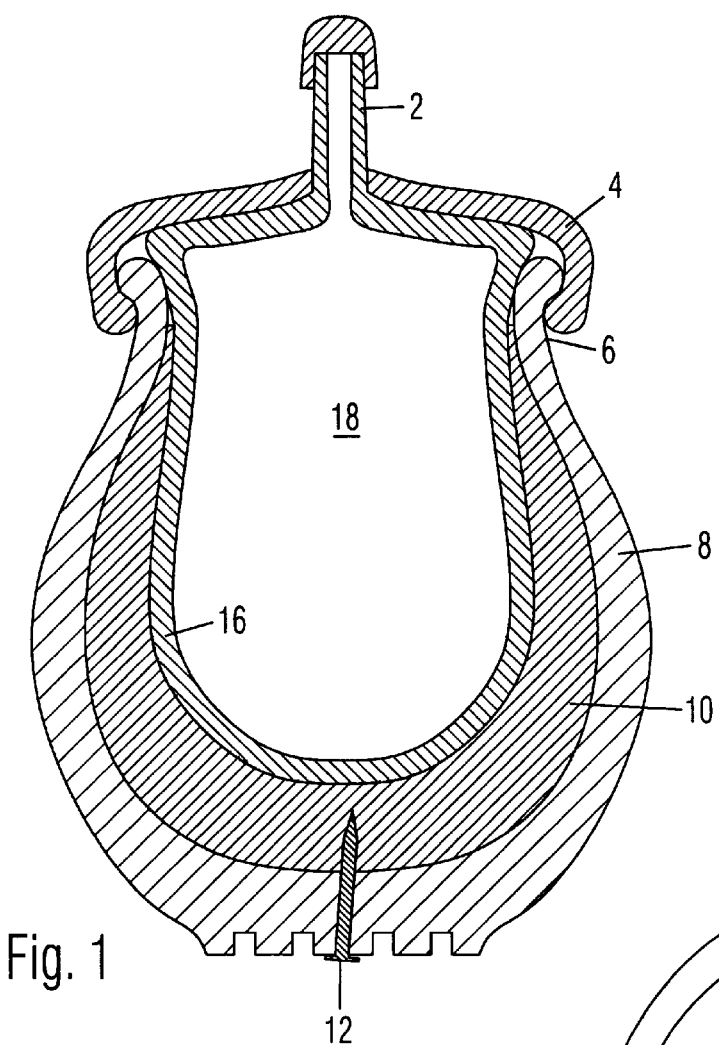
FIG. 1 is a cross section view of the tire liner of the present invention while in place in a bicycle tire.

Now referring to FIG. 1 we see a cross section of a bicycle tire with the liner of the present invention installed. The liner 10 is roughly U shaped with a thicker section near the tread portion of the tire casing and a thinner tapering portion at the ends of each leg of the U shape. The thickest portion of the liner 10 is approximately three quarters of an inch thick. When the user accidentally rides over a nail 12, thorn or other sharp object, the object pierces the tire casing 8 but does not reach the inner tube 16 because inner tube 16 is held away from tire casing 6 by liner 10.The tire therefore remains inflated and serviceable. The walls of the liner 10 extend to the height of the tire casing 8. This U shaped configuration solves two problems. Firstly, the U shape easily conforms to the inner surface of the tire casing 8 so that during installation of liner 10 the liner 10 automatically is in the proper orientation when inner tube 16 is inflated with air 18. Liner 10 also remains in the proper orientation during use because it can not slip from side to side. Secondly, the tapered side walls of U shaped liner 10 extend high enough so that they provide a cushioned barrier at point 6, the spot where the tire casing meets the wheel rim 4. This is important because there is a tendency for small rocks or other debris to become trapped between the wheel rim 4 and tire casing 8, especially in the case of off road mountain bikes and the like. The rock or other debris causes abrasion of the tire casing and also passes the resulting stress onto the inner tube 16. Liner 10 acts as a buffer so that less stress is passed onto inner tube 16 at point 6 thereby decreasing the chance of side wall punctures.

The user inflates inner tube 16 by normal means through valve stem 2. However, if the recommended tire pressure is 60 psi the user would inflate the inner tube to about 30 psi when the liner 10 is in place. This is because the liner 12 takes up space inside the tire casing and creates a firm substrate which is equal to the firmness of a tire inflated to a higher psi. The rolling resistance of a tire and liner of the present invention is equal to the rolling resistance of a tire with no liner which is inflated to approximately twice the psi as the liner supported tire. The lower psi used in the liner 10 supported tire helps contribute to increased inner tube life because the inner tube is not under as much pressure.

Figure 2:
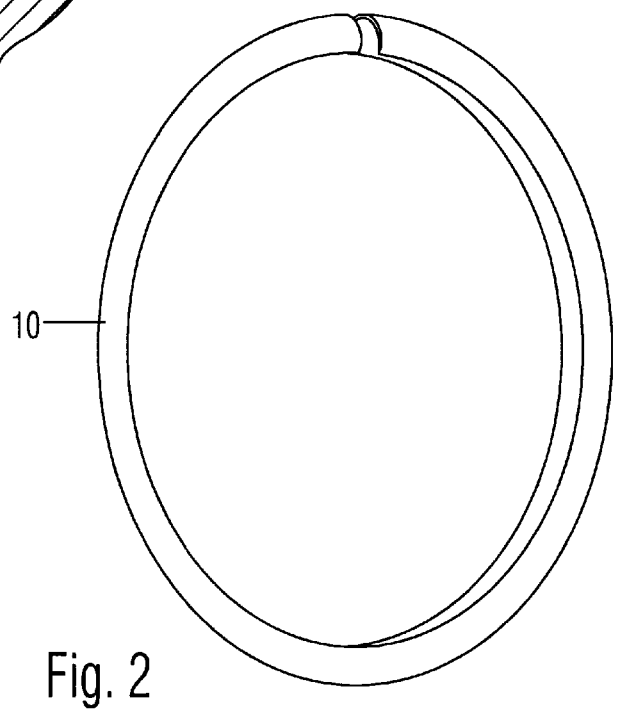
FIG. 2 is a perspective view of the tire liner of the present invention.

Extensive research was carried out by the inventor of the present invention to determine the ideal material in which to make the liner 10. The material has to be light weight because serious bike riders are very concerned about excess weight. The liner 10 also has to have a resistance to excess compression which would defeat the purpose of the invention because the distance between the tire casing 8 and the inner tube 16 would be lessened thereby decreasing the effectiveness of the liner. The liner has to be relatively inexpensive for realistic retail sales and the liner has to be easy to install. After considerable testing, it was discovered that a PVC Nitrile Elastomer foam manufactured by Kirkhill Rubber #3PNS322 has the ideal combination of light weight, compression resistance, relatively inexpensive cost and ease of instillation. The Nitrile Elastomer is extruded by conventional means, however, as the extrusion exits the extrusion die it is manually curved before it is completely cured so that the resulting shape is a round, tire-like diameter as shown FIG. 2. This is done because if a straight length U shaped flexible material is bent into a curve, the side walls of the U tend to pucker. This condition is undesirable for the present application. The extruded U shaped liner 10 can be cut to length more precisely during installation by cutting with a conventional scissors. In this way, a person can prevent inner tube punctures causing flat tires in bicycles or the like by inserting the tire liner of the present invention into a standard bicycle tire casing while not adversely affecting the performance of the bicycle. The same holds true for motorcycle tires.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A protective liner for a bicycle or motorcycle tire, comprising:

an elongated piece of PVC nitrile elastomer foam with a U-shaped cross section adapted to be positioned between a tire casing and an inner tube for spacing said inner tube from said tire casing, thereby preventing puncture of said inner tube by a sharp object piercing said tire casing, said PVC nitrile elastomer foam having enough resistance to excess compression for generally resisting a reduction in a distance between said tire casing and said inner tube.

* * * * *